US012705178B2

(12) United States Patent
O'Mahony et al.

(10) Patent No.: US 12,705,178 B2
(45) Date of Patent: Aug. 11, 2026

(54) DATA PREFETCHING OPERATIONS WITH TRUSTWORTHY ENERGY AWARENESS

(71) Applicant: Dell Products L.P., Round Rock, TX (US)

(72) Inventors: Aidan O'Mahony, Cork (IE); Ahmed Khalid, Cork (IE); Alan Barnett, County Cork (IE); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/421,226

(22) Filed: Jan. 24, 2024

(65) Prior Publication Data

US 2025/0238377 A1 Jul. 24, 2025

(51) Int. Cl.

*G06F 12/08* (2016.01)
*G06F 1/3293* (2019.01)
*G06F 12/0862* (2016.01)

(52) U.S. Cl.

CPC ........ *G06F 12/0862* (2013.01); *G06F 1/3293* (2013.01); *G06F 2212/6028* (2013.01)

(58) Field of Classification Search

CPC ............... G06F 12/0862; G06F 1/3293; G06F 2212/6028; G06F 2212/6024
USPC .......................................................... 711/137
See application file for complete search history.

(56) References Cited

U.S. PATENT DOCUMENTS 6,253,246 B1 6/2001 Nakatsuyama
6,345,101 B1 2/2002 Shukla
6,351,686 B1 2/2002 Iwasaki et al.
7,185,138 B1 2/2007 Galicki
8,185,712 B2 5/2012 Sarkar et al.
8,510,573 B2 8/2013 Muller et al.
9,037,672 B2 5/2015 Chang et al.
9,239,794 B1 * 1/2016 Merchant ............ G06F 12/0868
10,394,453 B1 8/2019 Bigman
10,715,176 B1 7/2020 Singh et al.
11,829,600 B2 11/2023 Mizushima et al.
2002/0026543 A1 2/2002 Tojima et al.
2003/0217246 A1 11/2003 Kubota et al.
2007/0011380 A1 1/2007 Kawai et al.
2007/0096954 A1 5/2007 Boldt et al.
2009/0100470 A1 4/2009 Yai et al.

(Continued)

OTHER PUBLICATIONS

Cherubini, et al, "Data Prefetching for Large Tiered Storage Systems," 2017 IEEE International Conference on Data Mining (ICDM), New Orleans, LA, USA, 2017, pp. 823-828.

(Continued)

*Primary Examiner* — Hua J Song

(74) *Attorney, Agent, or Firm* — Workman Nydegger

(57) ABSTRACT

Energy aware data prefetching is disclosed. Data stored in a source storage may be retrieved or prefetched to a target storage based on a prefetching time predicted or estimated by an awareness engine. The awareness engine may include models configured to predict the prefetching time so that the prefetching time accounts for a cost and/or source of energy. The prefetching operation is performed at the prefetching time. The models of the awareness engine may also be configured to recommend a source for the prefetching operation from among multiple potential sources for the prefetching operation in an energy aware manner.

20 Claims, 5 Drawing Sheets

(56) References Cited

U.S. PATENT DOCUMENTS

2009/0135700 A1 5/2009 Fujibayashi
2009/0281847 A1 11/2009 Hamilton et al.
2009/0282273 A1 11/2009 Hamilton et al.
2010/0070888 A1 3/2010 Watabe et al.
2012/0106334 A1 5/2012 Tanaka
2012/0303788 A1 11/2012 Heinrich et al.
2013/0275794 A1 10/2013 Annavaram et al.
2013/0339468 A1 12/2013 Chang et al.
2015/0149130 A1 5/2015 Chiu et al.
2015/0282039 A1 10/2015 Park et al.
2016/0148100 A1 5/2016 Chang et al.
2016/0344646 A1 11/2016 Wang et al.
2017/0060633 A1 3/2017 Suarez et al.
2017/0064632 A1 3/2017 Ohshima et al.
2017/0244969 A1 8/2017 Wongpaisarnsin et al.
2018/0219965 A1* 8/2018 Yellin .................. H04L 67/535
2018/0307640 A1 10/2018 Motai et al.
2018/0330767 A1 11/2018 Lea et al.
2020/0167190 A1 5/2020 Bernat
2020/0185058 A1 6/2020 Song et al.
2020/0201574 A1 6/2020 Nagata et al.
2020/0311287 A1 10/2020 Kaul et al.
2020/0387518 A1 12/2020 Kesarwani et al.
2020/0401405 A1 12/2020 Lasch et al.
2020/0403633 A1 12/2020 Lasch et al.
2021/0026707 A1 1/2021 Rosenberg
2021/0300401 A1 9/2021 Hashimoto et al.
2021/0342673 A1 11/2021 Shah et al.
2021/0342733 A1 11/2021 Kotler et al.
2021/0344549 A1 11/2021 Babington et al.
2022/0066647 A1 3/2022 Krasner et al.
2022/0210218 A1 6/2022 Nomura et al.
2023/0122901 A1 4/2023 Wang et al.
2023/0305703 A1 9/2023 Zamir et al.
2024/0086328 A1* 3/2024 Vazhkudai .......... G06F 12/0862
2024/0086711 A1 3/2024 Wilkins et al.
2024/0129380 A1 4/2024 Ganju et al.
2024/0163251 A1 5/2024 Karas

OTHER PUBLICATIONS

Shah et al, "Energy aware routing for low energy ad hoc sensor networks," 2002 IEEE Wireless Communications and Networking Conference Record. WCNC 2002 (Cat. No.02TH8609), Orlando, FL, USA, 2002, pp. 350-355 vol. 1.

* cited by examiner

Awareness Engine
206
Recommendation
210
Local
Storage System
(Or Cache)
204
Data
208
Application
202
Prefetching
Engine
212
Queue
218
Storage Array
216
Storage Array
214

DATA PREFETCHING OPERATIONS WITH TRUSTWORTHY ENERGY AWARENESS

FIELD OF THE INVENTION

Embodiments of the present invention generally relate to prefetching data. More particularly, at least some embodiments of the invention relate to systems, hardware, software, computer-readable media, and methods for prefetching data with energy awareness.

BACKGROUND

Data prefetching typically refers to the process of downloading or retrieving data in advance of or in anticipation of needing the data. In other words, an application (or user or storage system) may attempt to identify the data that an application may require in the future. The identified data is prefetched and stored or cached. If the identified data is not the correct data, the data actually required is retrieved when requested. This may introduce a delay into the execution of the application in terms of at least time. If the data retrieved in advance is the data actually required by the application, then the execution of the application is more efficient because the data is already downloaded/cached and ready for consumption.

Data prefetching incurs costs related to simply prefetching the data from the data source. However, data prefetching may also be associated with time, location, and energy costs.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to prefetching data from a data source. More particularly, at least some embodiments of the invention relate to systems, hardware, software, computer-readable media, and methods for prefetching data with energy awareness. Energy awareness may include prefetching data when energy costs are low, to encourage or consume green (e.g., renewable) energy, or other reasons.

Storage systems, including storage arrays, are generally configured to store data. The storage system (or an application) may identify data needed for executing an application (or for other purposes), retrieve the data from a data source, and use the data. When the data is requested, the requested data is available for consumption or use. In order to improve the efficiency of the application, the data that may be needed or required by the application may be identified and cached in advance. Prefetching the data in this manner can improve the efficiency of the application at least because the data is cached/stored locally (or at a closer storage array) and the application does not need to wait for the data to be retrieved from the original data source, which may be remote (e.g., cloud-based) relative to the application.

Prefetching data can be complicated and various decisions may be made before the data is actually retrieved. For example, data is often replicated to various locations. As a result, prefetching the data may require a data source to be selected. In addition, there is no guarantee that the data being prefetched is the data the application will actually require.

Embodiments of the invention relate to prefetching data in an energy aware manner. This may include selecting a location in an energy aware manner (e.g., a specific data source from among potential data sources) and prefetching from that location in a manner that accounts for energy considerations, such as energy source, energy cost, grid conditions, or the like. Embodiments of the invention advantageously improve prefetching operations by accounting for the time required to perform the prefetching operation, a time to initiate or start the prefetching operation, energy use, energy cost, and/or energy sources.

Figure 1:
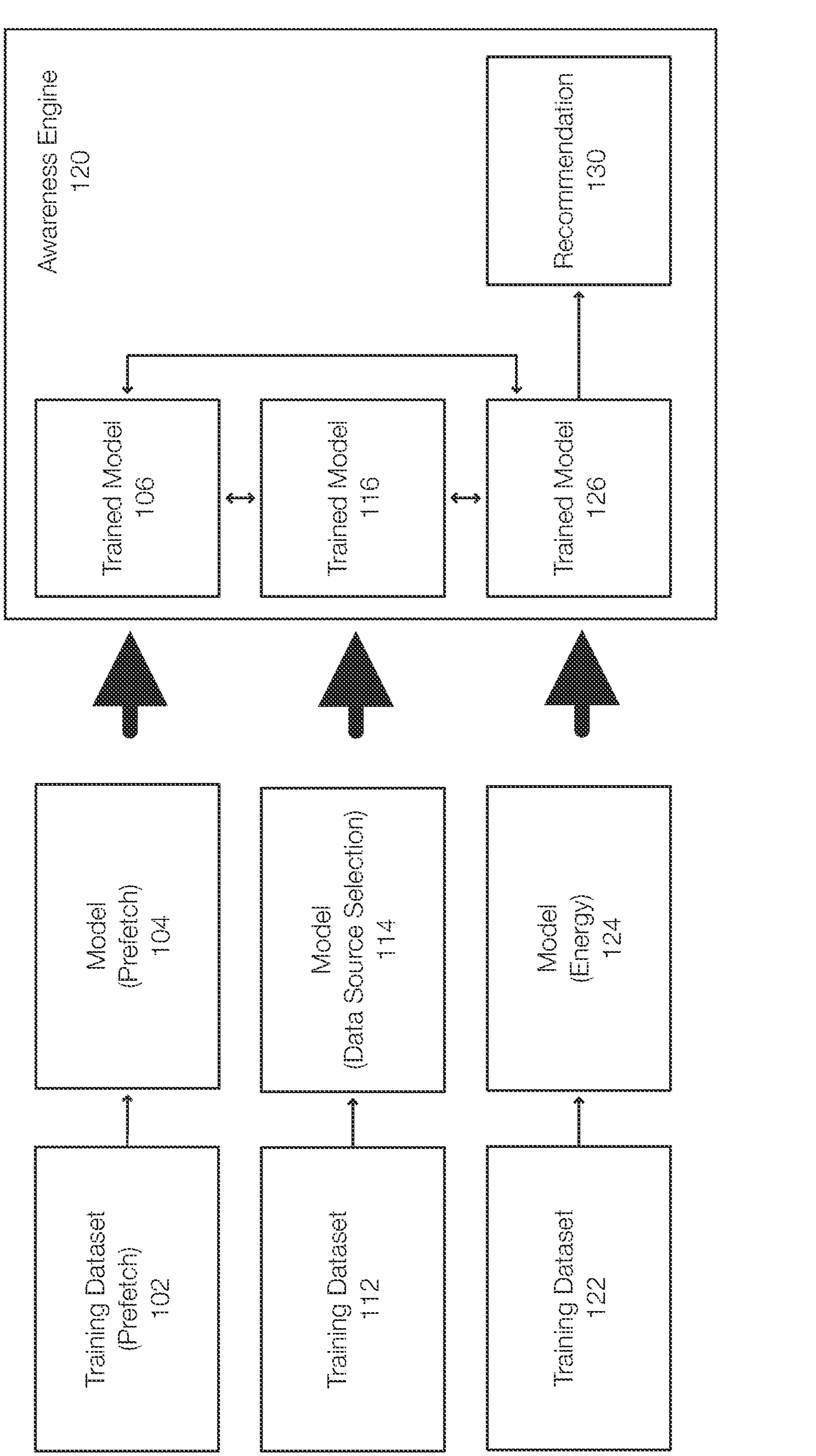
FIG. 1 discloses aspects of machine learning models configured to estimate migration and/or replication times in the context of energy sources/costs.

FIG. 1 discloses aspects of prefetching data with energy awareness. FIG. 1 generally relates to (i) a model 106 configured to estimate or predict a prefetching time, which may refer to the time required to perform the prefetching operation and/or to a time at which the prefetching operation is started, (ii) a model 116 configured to select a source storage system or location from which to retrieve data, and (iii) a model 126 configured to estimate aspects of energy awareness such as energy cost. These models may be independent or combined. For example, the training dataset 102 may include information related to data source such that the output of the trained model 106 accounts for or includes a recommended location.

For example, the prefetching time generated by the model 106 may indicate that an hour is required to download the data and that the prefetching operation should be initiated between 3 and 4 μm. The model 116 may predict or recommend a first location. The model 116 may predict energy costs for various times (e.g., the next 6 hours). This may enable the prefetching operation to being at an appropriate time to account for energy considerations.

More specifically, FIG. 1 illustrates a model 104, a model 114, and a model 124 that are trained, respectively, with training datasets 102, 112, and 122. The training dataset 102 includes historical data related to previously performed (historical) prefetching operations that can be used to train the model 104 to predict or estimate a prefetching time (e.g., duration, and starting times of the prefetching operation). The training dataset 102 may include information (e.g., features) describing or related to data that was prefetched that may include, but are not limited to, size of the prefetched data, time required to prefetch the data, network bandwidth/conditions, and the like. The trained model 106 may also receive features of the source data to be prefetched (e.g., size), features of the source storage array, features of the source storage system, features of the network, geographic location of the data being prefetched, location of the target storage system (system to which the data being prefetched is stored), characteristics of the target storage system, or the like and the model 106 may predict or estimate a time required to prefetch the data to the target and a time required to perform the prefetch operation. This information allows a trained model 106 to be generated that, for a prefetching operation, predicts or estimates the prefetching time.

The training dataset 112 may include data that can be used to train the model 114. The training dataset 112 may include historical aspects or features related to selecting a data source or location for prefetching data. The features may include a data size of the data to be prefetched, source information (e.g., hardware specifications), target information, network information (e.g., bandwidth), location data, or the like. The trained model 116, which results from training the model 114, is capable of predicting or recommending an optimal location for the prefetching operation.

The training dataset 122 may include data that can be used to train the model 124. The training dataset 122 may include historical weather data, historical energy costs (renewable and nonrenewable), energy production data (energy produced from renewable/non-renewable sources), historical watt energy supplied to the grid from renewable and non-renewable sources, and the like.

The trained model 126 can, using current and/or forecasted weather data and/or current and/or forecasted energy data, predict, estimate, or infer an energy source, cost of energy, or the like.

Generally, the models 106, 116, and 126 may generate predictions or estimates that allow decisions to be made regarding a prefetching operation with energy awareness. In one example, outputs of the model 106 and/or the model 116 may be input to the model 126. The model 126 may generate a recommendation 130 that accounts for the prefetching time, prefetching location, and/or energy characteristics or considerations. The models 106, 116, and 126 may be combined in other manners.

Generally, regardless of how the models 106, 116, and 126 interact or are connected, the awareness engine 120 may use the outputs of the trained models 106, 116, and 126 separately, in a chained manner, or the like, to provide recommendations regarding prefetching operations and sources of data for the prefetching operations.

The recommendation 130 generated by the awareness engine 120 may account for energy cost, energy source or the like, the source used for the prefetching operation, and/or the prefetching time. More specifically, the awareness engine 120 may recommend performing the prefetching operation from a particular source storage array at a time when the energy cost is low or is expected to be low and that the prefetching operation be initiated in a particular time window. If the awareness engine 120 is able to select the energy source, embodiments of the invention can balance prefetching operations and energy costs. For example, a customer may desire to perform the operation when a renewable energy source is contributing to the grid, even if more expensive. For example, a particular data source may be powered by renewable energy, a policy may be to use that data source regardless of cost or as long as anticipated energy cost is below a threshold energy cost.

The models 106, 116, and 126 can be deployed to a data source such as a storage array or to a prefetching engine. Based on the location or data source recommendation and/or the prefetching time, data may be prefetched from a particular source at an optimal time (e.g., when energy costs are comparatively low). Embodiments of the invention also allow other policies to be considered when selecting a time and/or location for performing a prefetching operation.

Figure 2:
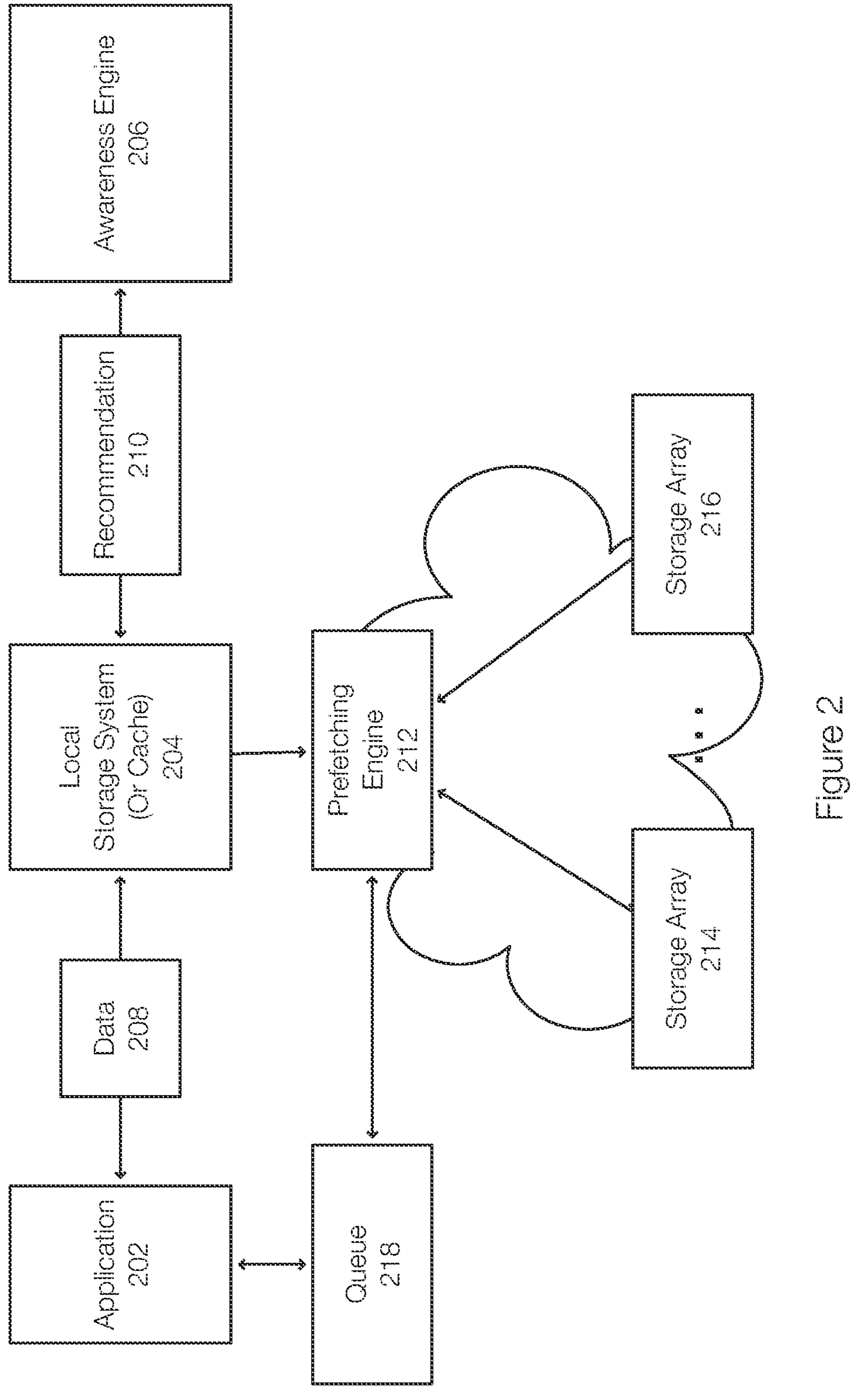
FIG. 2 discloses aspects of an energy aware data migration system and/or replication system.

FIG. 2 discloses aspects of a system configured to prefetch data in an energy aware manner. FIG. 2 illustrates an application 202 that may use/consume data stored in a local storage system 204. The data required or used by the application 202 may be stored in one or more of the storage systems represented by storage arrays 214 and 216, which may be remote relative to the application 202 and/or the local storage system 204. The data 208 can be retrieved from any of the storage arrays 214 and 216 and may be prefetched by the prefetching engine 212 and stored in the local storage system 204 (or cached). Thus, when the data 208 is needed by the application 202, the data 208 can be retrieved from the local storage system 204. Advantageously, when the data 208 is needed or requested by the application 202, there is no need to spend time selecting a source (e.g., one of the storage arrays 214 and 216) and wait for the data 208 to be retrieved. Rather, embodiments of the invention prefetch the data 208 and store the data 208 in the local storage system 204 in anticipation of a request for the data 208 from the application 202.

Although the local storage system 204, prefetching engine 212, and awareness engine 206 are illustrated separately, they may be integrated and be part of the same component, such as the storage system 204.

In one example, a queue 218 may identify the data to be prefetched and stored in the local storage system 204. The prefetching engine 212 may read the queue 218 to identify data to be prefetched. The data identified in the queue 218 may be associated with a priority. High priority data is needed quickly and embodiments of the invention may prefetch the data without considering the impact of energy cost or energy source.

For data in the queue 218 that is less urgent, the prefetching engine 212 may use the awareness engine 206. The models in the awareness engine may be used to generate a recommendation regarding a source from which to prefetch the data and a time (or a time window) at which to prefetch the data. For example, the awareness engine 206 may recommend using the storage array 214 and identify a time window during which the prefetching operation should commence. This decision may be made by the prefetching engine 212 to select the best option or combination (storage array/prefetching time). Alternatively, the application 202 (or customer) may make decision regarding the recommendations provided by the awareness engine 206.

The recommendations generated by the awareness engine 206 may include or account for an anticipated energy cost. Using current weather data (which may include forecasted weather data), energy costs, anticipated energy costs, energy production levels or anticipated energy production levels, source array locations, target array location, and/or other input, the models included the awareness engine 206 may enable the prefetching engine 212 to select the a source array and a best time to perform or commence the prefetching operation. Weather forecasts, energy forecasts, and the like may allow the awareness engine 206 to generate multiple potential migration times/energy costs. This allows the prefetching engine 212 (or more generally the storage system 204 or application 202) to select a specific combination of array/prefetching time that suits multiple policies including an energy policy.

For example, the awareness engine 206 may indicate a first energy cost and the storage array 214 if the prefetching operation commences at noon (the first prefetching time).

The awareness engine 206 may indicate a second cost and the storage array 216 if the prefetching operation commences at 1 pm. This presents several possibilities. For example, the first cost may be lower than the second cost while, at the same time, the first prefetching time requirement (time to perform the prefetching operation) is longer than the second prefetching time requirement. The prefetching engine 212 may consider these predictions or estimates as well as other prefetching policies in selecting the source storage array and the prefetching time (i.e., time to commence the prefetching operation) generated by the awareness engine 206.

Thus, the storage system 204, or the prefetching engine 212, may communicate with the awareness engine 206 to obtain a recommendation 210 or inference regarding selecting a source storage array and a prefetching time that are energy aware or that account for energy considerations. In one example, the awareness engine 206 and the prefetching engine 212 are part of or components of the storage system 204.

Figure 3A:
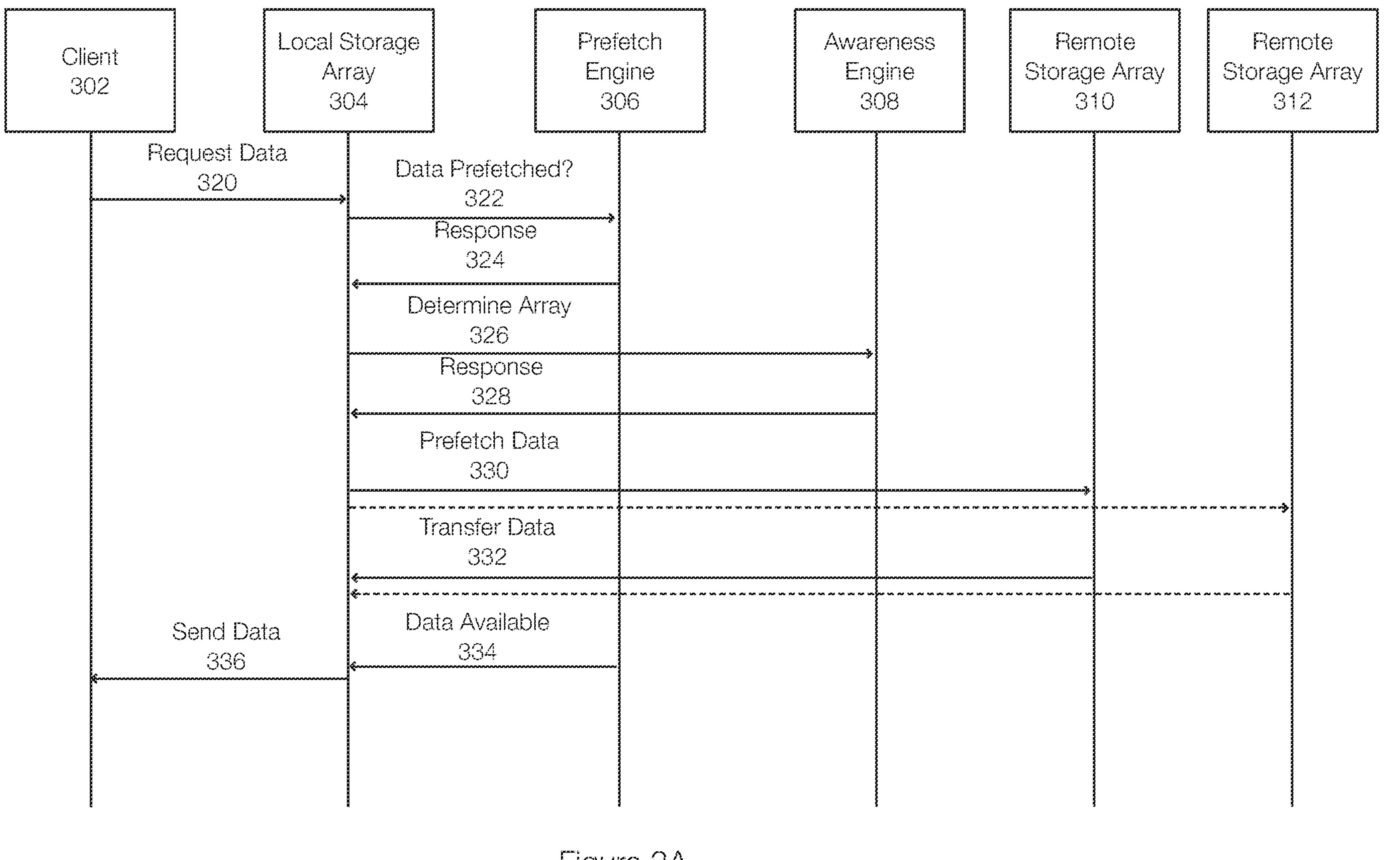
FIG. 3A discloses aspects of a method for energy aware data migration.

FIG. 3A discloses aspects of a method for performing a prefetching operation. FIG. 3A illustrates aspects of identifying or recommending a data source from which to prefetch data that may be required by a client or application.

FIG. 3A illustrates a client 302 (e.g., a user, customer, application) and a local storage array 304. The client 302 may consume or use data stored in the local storage array 304 (or a local cache). A prefetch engine 306 is configured to retrieve data from one of several remote storage arrays, represented by storage arrays 310 and 312. The awareness engine 308 is configured to recommend, to the local storage array 304, a remote storage array to use in the prefetching operation. The awareness engine 308 includes a model or models configured to identify a data source for the prefetching operation in an energy away manner.

FIG. 3A illustrates aspects of methods that may begin in the context of a request for data. For example, the client 302 may request data 320 from a local storage array 304. The request may be in the form of a queue that may be read by the local storage array 304. The request may also be a request for data required immediately. Generally, the request for data may refer to data that may be required soon or at some point in the future. For example, a backup operation may be restoring data from an image. As the backup operation processes a first block of information, a request for a next anticipated block may constitute the request 320. The block or data may be prefetched in this example so that the data is available when the backup operation is ready for the next block.

The client 302 may be configured to identify the data that will be needed in advance and to advise the local storage array 304 of this need (e.g., using the request 320). The local storage array 304 may communicate with the prefetch engine 306 to determine whether the data has already been prefetched 322. When the response from the prefetch engine 306 is that the data has been retrieved, the response 324 is that the data is available 334 and the data may be sent 336 to the client 302.

If the response 324 is that the data has not been downloaded or retrieved, the local storage array 304 may send a request to the awareness engine 308 to identify or determine 326 a recommended array or data source. The awareness engine 308 may consider features of the data requested, a location of the client 302, a location of the available remote storage arrays, network conditions, or the like or combinations thereof. The awareness engine 308 may also consider or account for energy aspects (e.g., energy source, energy cost) in recommending a particular storage array.

For example, a policy associated with the client 302 may favor renewable energy even if cost is more. The awareness engine 308 may consider aspects related to the production of renewable energy such as current weather conditions (e.g., cloudy, time of day) or the like. In this example, the remote storage array 310 may be powered by renewable energy (or connected to a grid that uses renewable energy) and the remote storage array 312 may be powered by this grid. If the weather is poor, the energy cost associated with the remote storage array 310 may be too much. If not over a threshold cost, however, the remote storage array 310 may be selected regardless. Alternatively, the awareness engine 308 may consider the energy delivered to the grid generally from renewable and non-renewable energy sources.

More generally, the awareness engine 308 may be configured to estimate the cost of energy at various times. Thus, the awareness engine 308 may recommend a particular time or time window during which the prefetching operation should be performed to incur the lowest energy cost. If multiple options are provided (e.g., multiple time windows and anticipated energy cost), the client 302 (or prefetch engine 306) may be able to select the time window (prefetching time) and/or data source combination that best satisfies all policies associated with the prefetching operation. As previously stated, the ability to selectin any prefetching time/data source combination may be limited by the urgency of the request. For example, the request 320 may indicate that the data is required in the next hour or the next two hours. These factors may influence the data source selected.

In this example, the response 328 from the awareness engine 308 may suggest the remote storage array 310 and a prefetching time. The local storage array 304 then retrieves the requested data or prefetches 330 the data at the prefetching time and the data is transferred 332 to the local storage array 304 from the remote storage array 310. If the storage array 312 were recommended, the data would be retrieved from the remote storage array 312 at the corresponding prefetching time.

Once the data is prefetched, the prefetch engine 306 indicates that the data is available 334 and the data is sent 336 to the client for consumption when needed by the client 302.

FIG. 3A illustrates an example process of selecting a remote storage array from which to obtain data. FIG. 3A may operate for data specifically requested from the client (needed immediately) and may also be used to prefetch data. In one example, data for future client requests is prefetched by identifying the remote storage array in an energy aware manner and retrieving the data. For example, rather than waiting for an immediate request 320 for data from the client, a queue of data that has been identified is prefetched in anticipation of a request for the data. When the client request 320 is received, the data may be present in the local storage array 304 (or a cache).

Figure 3B:
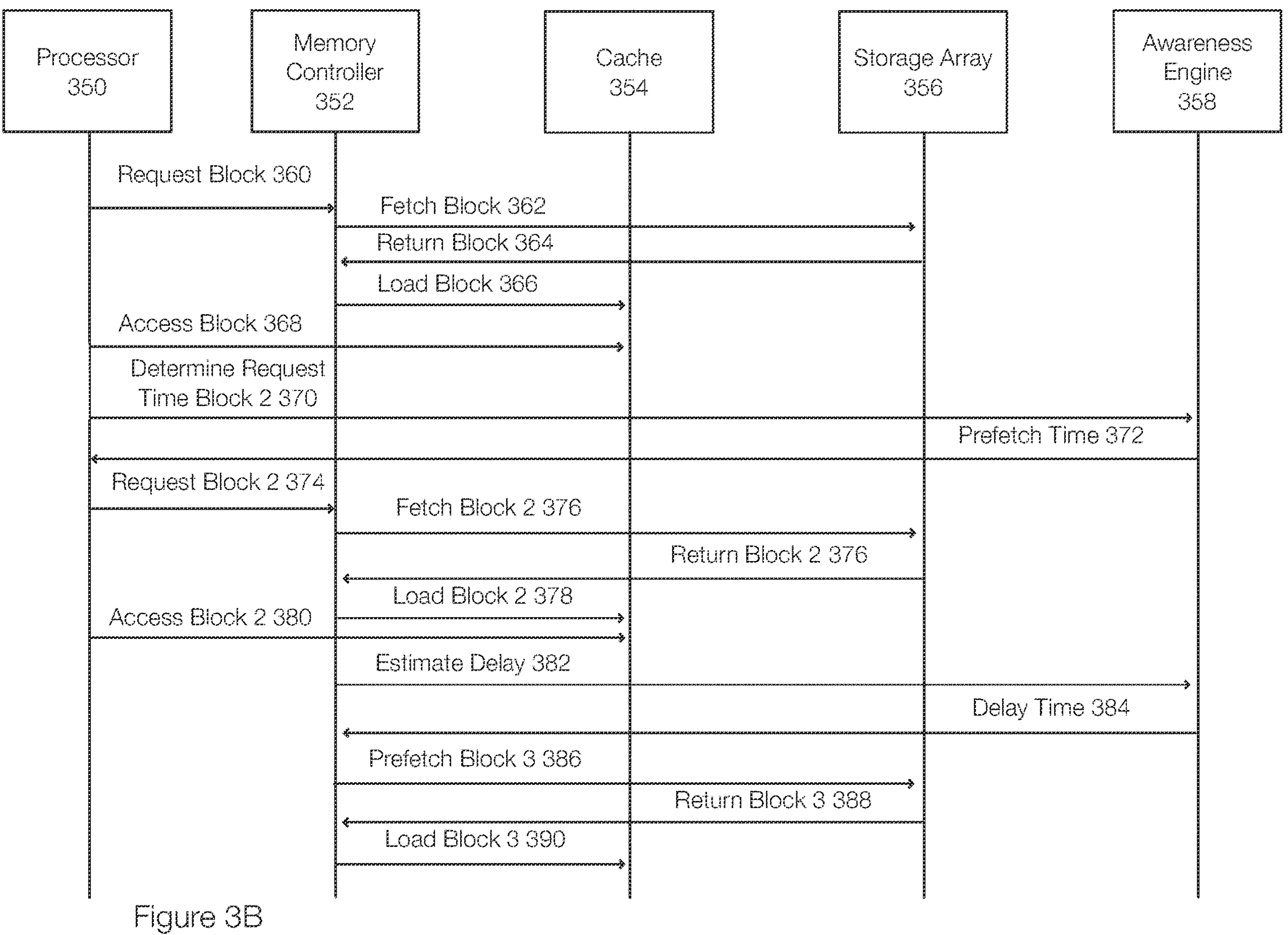
FIG. 3B discloses aspects of a method for energy aware data migration.

FIG. 3B discloses additional aspects of prefetching data. FIG. 3B is described in the context a processor 350, memory controller 352, cache 354, and storage array 356, which storage array 356 may be remote. More specifically, the storage array 356 may have been identified using the method of FIG. 3A.

In FIG. 3B, the processor 350 requests a block 360 from a memory controller 352. The memory controller 352 fetches 362 the block from the storage array 356. The block is returned 364 and the memory controller 352 loads 366 the block into the cache 354. The processor may then access 368 the block in the cache 354.

Next, a request (prefetch) time is determined by the processor 350 for block 2 by querying the awareness engine 358. The prefetch time 372 is returned for the block 2. Block 2 is then requested 374 at the prefetch time recommended by the awareness engine 358. The memory controller then fetches the block 2 376 from the storage array 356 and the block 2 is returned 376. The memory controller loads 378 the block 2 in the cache 354 and the processor 350 accesses 380 the block 2 that was stored in the cache 354 when needed.

The memory controller 352 may estimate 382 a delay for retrieving a block 3 by sending a request to the awareness engine 358. The prefetch time (or delay) 384 is determined and returned to the memory controller 352. Block 3 is prefetched 386 at the prefetch time and returned 388. The block 3 is loaded 390 into the cache 354.

In this example, the block 3 is thus prefetched and loaded in the cache 354 in anticipation of receiving a request for the block 3 from the processor 350.

In this example, the prefetch time generated or predicted by the awareness engine 308 accounts for energy cost, energy source, aspects of the prefetching operation, and/or the like. The prediction or recommendation may also account for or identify a specific storage array from which to prefetch the data. For example, the prefetch time may correspond to a time during which energy costs are reduced or less expensive. This may be based on current weather conditions, forecasted conditions, or other conditions that may impact the cost of energy. In one example, the location of the energy source and/or the source/target storage arrays may also be considered. The prefetch time may correspond to a time when a renewable energy source is online and producing renewable energy.

Thus, the response or recommendation from the awareness engine 308 may account for the energy source and/or energy cost, selected source array, or the like in providing the prefetch time. The response or recommendation may, alternately, provide an energy assessment separately. For example, the response may identify anticipated energy costs for multiple times (multiple time windows). This allows the prefetch engine to select a prefetch time that is cost-effective while also complying with or accommodating other policies. For example, it may be necessary to start a prefetch operation within a certain time limit (e.g., before midnight). Thus, the prefetch engine will select a prefetch time that complies with this policy as well. The prefetch model, which may be trained to predict or infer energy cost based on weather data, grid data, and the like, allows the prefetch operation to be performed in an energy aware manner.

As apparent from this disclosure, an embodiment of the invention may possess various useful features and aspects, although no embodiment is required to possess any of such features or aspects. Embodiments of the invention may include or relate to prefetching operations, energy awareness related operations, energy aware prefetch operations, or the like. Embodiments of the invention may relate to any operations related to prefetching data in an energy aware manner.

Following are some further example embodiments of the invention. These are presented only by way of example and are not intended to limit the scope of the invention in any way.

Embodiment 1. A method comprising: requesting a prefetching time for performing a prefetching operation to prefetch data from a source storage to a target storage, wherein the prefetching time is requested from an awareness engine that includes a prefetching model configured to estimate the prefetching time, retrieving the data from the source storage to the target storage at the prefetching time, wherein the prefetching time determined by the awareness engine accounts for an energy cost associated with prefetching the data to the target storage, and storing the prefetched data at the target storage, wherein the target storage is local to a client.

Embodiment 2. The method of embodiment 1, wherein the prefetching time comprises a prefetching window and an estimated time to perform the prefetching operation.

Embodiment 3. The method of embodiment 1 and/or 2, further comprising generating the prefetching time by inputting features including weather features, and features of the source storage and features of the target storage into a trained prefetching module configured to predict the prefetching time.

Embodiment 4. The method of embodiment 1, 2, and/or 3, further comprising waiting for the prefetching time window to arrive prior to performing the prefetching operation.

Embodiment 5. The method of embodiment 1, 2, 3, and/or 4, wherein the prefetching time is generated by at least one machine learning model trained on data associated with historical prefetching operations, historical energy costs, and factors influencing the energy costs.

Embodiment 6. The method of embodiment 1, 2, 3, 4, and/or 5, further comprising accounting for a source of energy or an estimated cost of the energy when performing the prefetching operation.

Embodiment 7. The method of embodiment 1, 2, 3, 4, 5, and/or 6, wherein the prefetching time is associated with lower energy costs.

Embodiment 8. The method of embodiment 1, 2, 3, 4, 5, 6, and/or 7, further comprising generating a recommended source of the data using a model configured to recommend a source for the prefetching operation, wherein the source storage was recommended by the model and accounts for at least energy cost.

Embodiment 9. The method of embodiment 1, 2, 3, 4, 5, 6, 7, and/or 8, further comprising receiving a request at the target storage from the client for a data block, determining whether the data block has been retrieved, and downloading the data block if not present at the target storage.

Embodiment 10. The method of embodiment 1, 2, 3, 4, 5, 6, 7, 8, and/or 9, further comprising reading a queue of data that is anticipated to be requested by the client, determining the prefetching time for the data in the queue, and prefetching the data based on a recommendation from the awareness engine.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term client, module, component, engine, agent, service, or the like may refer to software objects or routines that execute on the computing system or may also refer to hardware depending on context. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 4:
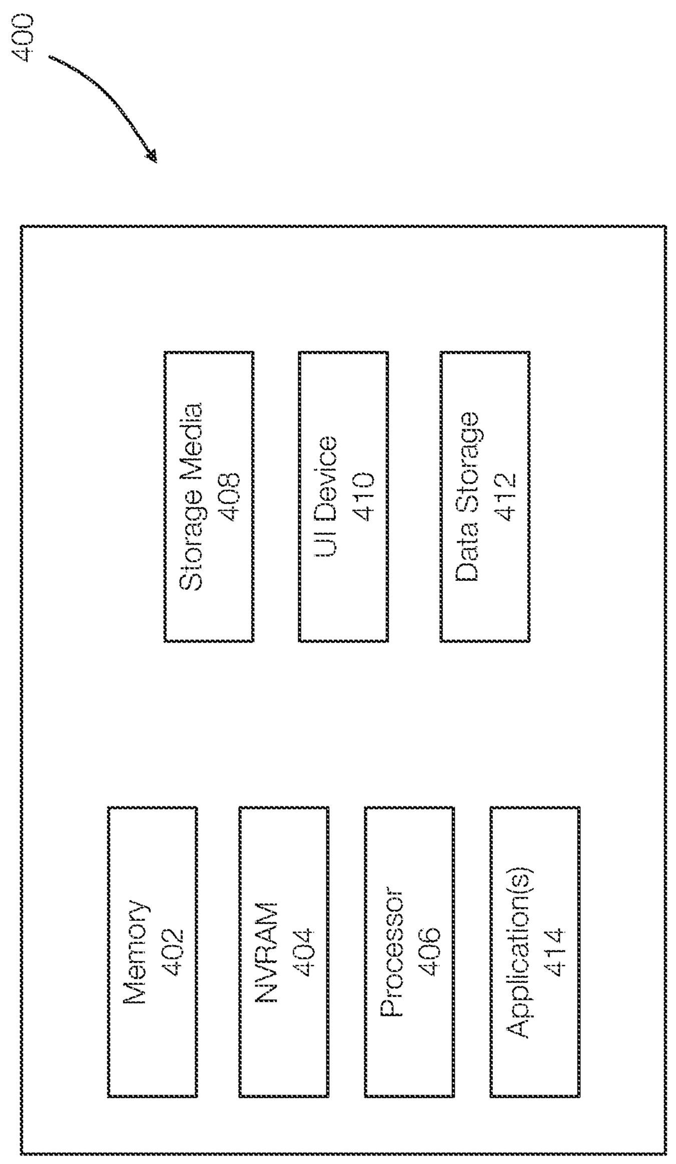
FIG. 4 discloses aspects of a computing device, system, or entity.

With reference briefly now to FIG. 4, any one or more of the entities disclosed, or implied, the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 400 may also be representative of servers, clusters of servers, nodes, or the like. The computing resources represented by the device 400 may represent the computing resources of a cloud provider that can be allocated or used for energy aware compression operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

requesting a prefetching time for performing a prefetching operation to prefetch data from a source storage to a target storage, wherein the prefetching time is requested from an awareness engine that includes a prefetching model configured to estimate the prefetching time;

retrieving the data from the source storage to the target storage at the prefetching time, wherein the prefetching time determined by the awareness engine accounts for an energy considerations associated with the source storage when prefetching the data from the source storage to the target storage, wherein the energy considerations include a type of energy and an energy cost; and storing the prefetched data at the target storage at the prefetching time, wherein the target storage is local to a client.

2. The method of claim 1, wherein the prefetching time comprises a prefetching window and an estimated time to perform the prefetching operation.

3. The method of claim 1, further comprising generating the prefetching time by inputting features including weather features, and features of the source storage and features of the target storage into a trained prefetching module configured to predict the prefetching time.

4. The method of claim 1, wherein the prefetching time comprises a prefetching time window, further comprising waiting for the prefetching time window to arrive prior to performing the prefetching operation, wherein the prefetching time window identifies a window of time for initiating the prefetching operation.

5. The method of claim 1, wherein the prefetching time is generated by at least one machine learning model trained on data associated with historical prefetching operations, historical energy costs, and factors influencing the energy costs.

6. The method of claim 1, further comprising accounting for a source of energy or an estimated cost of the energy when performing the prefetching operation.

7. The method of claim 1, wherein the prefetching time is associated with lower energy costs.

8. The method of claim 1, further comprising generating a recommended source of the data using a model configured to recommend a source for the prefetching operation, wherein the source storage was recommended by the model and accounts for at least energy cost.

9. The method of claim 1, further comprising receiving a request at the target storage from the client for a data block, determining whether the data block has been retrieved, and downloading the data block if not present at the target storage.

10. The method of claim 1, further comprising reading a queue of data that is anticipated to be requested by the client, determining the prefetching time for the data in the queue, and prefetching the data based on a recommendation from the awareness engine.

11. A non-transitory storage medium having stored therein instructions that are executable by one or more hardware processors to perform operations comprising:

requesting a prefetching time for performing a prefetching operation to prefetch data from a source storage to a target storage, wherein the prefetching time is requested from an awareness engine that includes a prefetching model configured to estimate the prefetching time;

retrieving the data from the source storage to the target storage at the prefetching time, wherein the prefetching time determined by the awareness engine accounts for an energy considerations associated with the source storage when prefetching the data from the source storage to the target storage, wherein the energy considerations include a type of energy and an energy cost; and storing the prefetched data at the target storage at the prefetching time, wherein the target storage is local to a client.

12. The non-transitory storage medium of claim 11, wherein the prefetching time comprises a prefetching window and an estimated time to perform the prefetching operation.

13. The non-transitory storage medium of claim 11, further comprising generating the prefetching time by inputting features including weather features, and features of the source storage and features of the target storage into a trained prefetching module configured to predict the prefetching time.

14. The non-transitory storage medium of claim 11, wherein the prefetching time comprises a prefetching time window, further comprising waiting for the prefetching time window to arrive prior to performing the prefetching operation, wherein the prefetching time window identifies a window of time for initiating the prefetching operation.

15. The non-transitory storage medium of claim 11, wherein the prefetching time is generated by at least one machine learning model trained on data associated with historical prefetching operations, historical energy costs, and factors influencing the energy costs.

16. The non-transitory storage medium of claim 11, further comprising accounting for a source of energy or an estimated cost of the energy when performing the prefetching operation.

17. The non-transitory storage medium of claim 11, wherein the prefetching time is associated with lower energy costs.

18. The non-transitory storage medium of claim 11, further comprising generating a recommended source of the data using a model configured to recommend a source for the prefetching operation, wherein the source storage was recommended by the model and accounts for at least energy cost.

19. The non-transitory storage medium of claim 11, further comprising receiving a request at the target storage from the client for a data block, determining whether the data block has been retrieved, and downloading the data block if not present at the target storage.

20. The non-transitory storage medium of claim 11, further comprising reading a queue of data that is anticipated to be requested by the client, determining the prefetching time for the data in the queue, and prefetching the data based on a recommendation from the awareness engine.

* * * * *